United States Patent
Weiler et al.

(10) Patent No.: US 9,129,541 B2
(45) Date of Patent: Sep. 8, 2015

(54) SYSTEM FOR A PLAY CALLER TO DISPLAY CALLS TO PARTICIPANTS IN AN ATHLETIC COMPETITION

(75) Inventors: Christopher Weiler, Fairfax Station, VA (US); Nii Larnyoh, London (GB)

(73) Assignee: MKN SERVICES, LLC, Fairfax Station, VA (US)

( * ) Notice: Subject to any disclaimer, the term of this patent is extended or adjusted under 35 U.S.C. 154(b) by 1142 days.

(21) Appl. No.: 13/070,530

(22) Filed: Mar. 24, 2011

(65) Prior Publication Data

US 2012/0242669 A1    Sep. 27, 2012

(51) Int. Cl.
  *G07C 15/00* (2006.01)
  *G09G 5/00* (2006.01)
  *A63B 71/06* (2006.01)

(52) U.S. Cl.
  CPC .............. *G09G 5/00* (2013.01); *A63B 71/0622* (2013.01)

(58) Field of Classification Search
  CPC ......... G06F 17/30; G06F 3/01; G06F 15/167; G06F 15/173; G06F 17/215; G06F 17/30867; G06F 19/707; G06F 1/26; G06F 21/602; G06F 21/6227; G06F 21/6245; G07C 15/00
  USPC ........................................................ 715/810
  See application file for complete search history.

(56) References Cited

U.S. PATENT DOCUMENTS

| | | | |
|---|---|---|---|
| 4,422,639 A * | 12/1983 | Del Principe et al. | 463/4 |
| 6,437,974 B1 * | 8/2002 | Liu | 361/679.27 |
| 7,677,570 B2 * | 3/2010 | Hohenstein et al. | 273/271 |
| 2007/0118423 A1 * | 5/2007 | Always | 705/14 |
| 2007/0296615 A1 * | 12/2007 | Raguseo | 341/51 |
| 2008/0206723 A1 * | 8/2008 | Hunter | 434/156 |
| 2008/0317263 A1 * | 12/2008 | Villarreal, Jr. | 381/120 |
| 2009/0078008 A1 * | 3/2009 | Gartner | 70/3 |
| 2009/0132917 A1 * | 5/2009 | Landry | 715/702 |
| 2010/0225502 A1 * | 9/2010 | Elsheemy | 340/908 |
| 2011/0012751 A1 * | 1/2011 | Jones | 340/825.69 |

OTHER PUBLICATIONS

Did Ohio State Steal Oregon's Signals in Rose Bowl?, The Wiz of Oz, Apr. 14, 2010, pp. 1-3.*
Football Codes & Code-Breaking, Reed, Mar. 2007, pp. 30-33.*
Random String Generator, random.org, 2007.*
Fantastic Outdoor Programmable Led Sign Scoreboards, Electro-Mech, 2009.*
Cripes! Get back to fundamentals . . . , Brophy, 2010.*
Accent Folding for Auto-Complete, Bueno, 2010.*

* cited by examiner

*Primary Examiner* — Stephen R Koziol
*Assistant Examiner* — Phong Nguyen
(74) *Attorney, Agent, or Firm* — Symbus Law Group LLC; Clifford D. Hyra (57) ABSTRACT

Disclosed is a system for displaying a play call to participants in an athletic competition, the system having an input device, a display device, a selector, a first block of at least three characters and a second block of at least three characters. The first and second blocks are separated by a division. The first and second blocks each contain one character selected by a play caller and one character selected by the selector.

25 Claims, 5 Drawing Sheets

SYSTEM FOR A PLAY CALLER TO DISPLAY CALLS TO PARTICIPANTS IN AN ATHLETIC COMPETITION

BACKGROUND OF THE INVENTION

1. Field of the Invention

The embodiments of the invention relate to a display system, and more particularly, to a system for displaying play calls to participants in an athletic competition. Although embodiments of the invention are suitable for a wide scope of applications, it is particularly suitable for communicating play calls in a way that opponents would not be able to decipher the play call before the beginning of the play.

2. Discussion of the Related Art

In general, play calls in an athletic competition are communicated from the coaching staff to the athletes verbally, using hand signals, or through printed sign boards. There are often strict time constraints in transmitting the play calls in the that the next play must be started quickly. For example, in (American) college football, a play must be started within 40 seconds. In high school football, a play must be started within 30 seconds. Accordingly, it is desirable to transmit the pay call efficiently so that the team receiving the play call can implement the call quickly without being penalized for delay. Play calls are often encoded so that an opponent does not know what play is being called.

The simplest form of play calling is verbal. In such a call, a play caller will verbally communicate the play to athletes. This can be achieved by shouting the play from the sidelines, or whispering the play to a single athlete who then informs the other athletes on the field. When play calls are shouted, the calls are typically encoded. For example, in football, a play call of "NASCAR" shouted from the sidelines may indicate a particular set or series of plays. The meaning is well known by the members of the team but not known to the opposition.

When plays are transmitted by hand signals, a member of the coaching staff will perform a series of gestures to communicate the play call to the athletes on the field. A first gesture may indicate which play to execute and a second gesture may indicate which player should have the ball. The meaning of the gestures is secret and only known to the players of one team.

Figure 1:
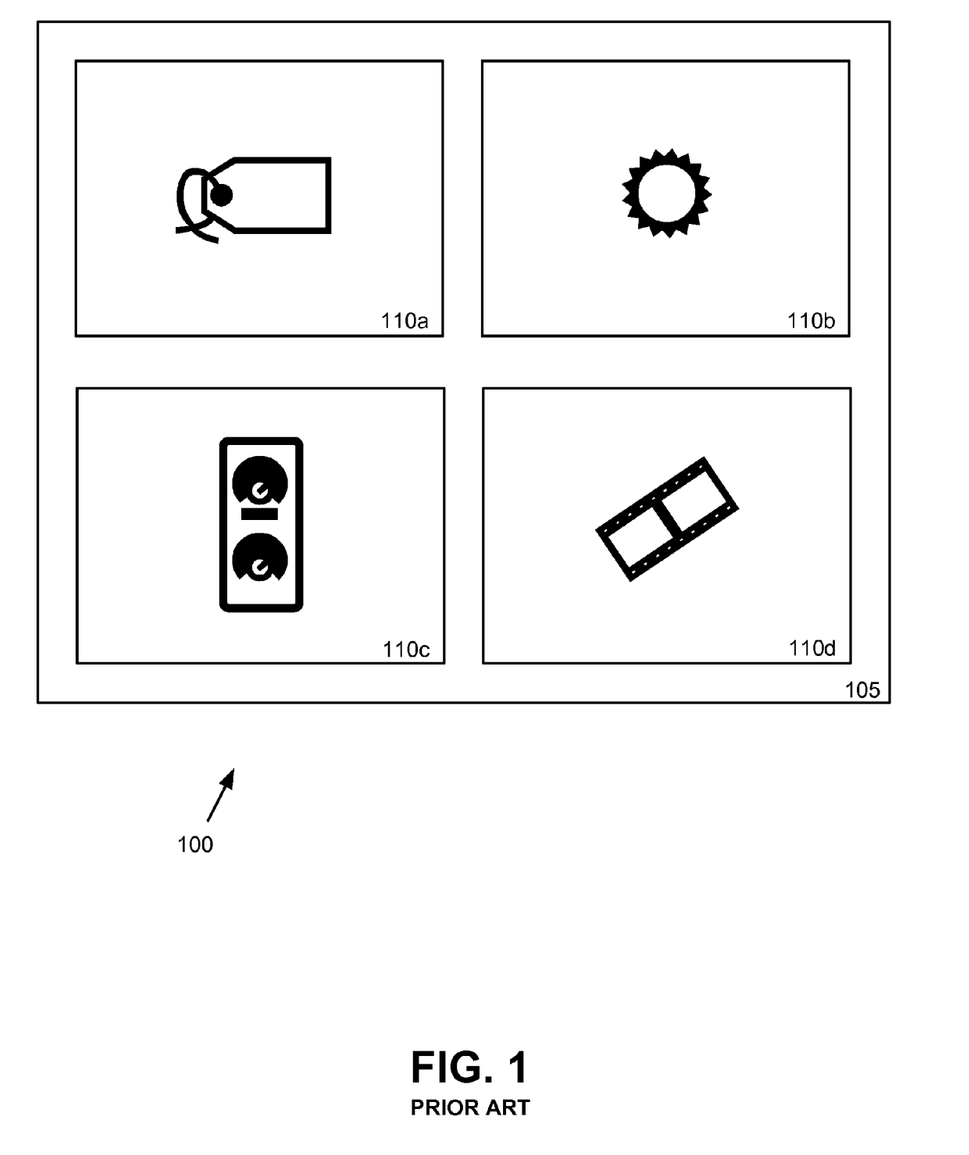
FIG. 1 shows a system for transmitting play calls on printed signboards according to the prior art.

FIG. 1 shows a system for transmitting play calls on printed signboards according to the prior art. As shown in FIG. 1, the system 100 includes a signboard 105 and a series of tiles 110a-110d. The tiles can be attached to the signboard in a separable manner, such as hook and loop fasteners. Each of the tiles 110a-110d has a unique graphic or symbol which indicates an attribute of the played called. For example in football, the tile 110a can indicate that the play should be a passing play. Tile 110b can indicate that the play should go to the secondary receiver. Tile 110c can indicate that the receiver should run a crossing route. Finally, tile 110d can indicate the snap count. The tiles 110a-110d are removable and replaceable so that a variety of plays can be called using a single signboard 105 and multiple tiles. Other signboards can also be used such that the opponent does not know which signboard is in use.

The prior art systems described above have the limitation that communication relies on a static encoding of play calls. The static encoding must be simple enough to be quickly perceived by the athletes while being complex enough to maintain secrecy from the opponents. Over the course of an athletic competition, or successive competitions between the same teams, an opponent may learn the encoding scheme.

Verbal transition of play calls becomes difficult when athletic competitions become noisy from cheering spectators. Hand gestures are also a difficult transmission medium in that the time to complete a play call is large when multiple gestures must be performed in succession to signal a single play. Hand gestures can be difficult for athletes to perceive if the athlete's view is obstructed or great distance is involved. Printed signboards, have the limitation that significant time is required to find, arrange, and affix the appropriate tiles to the board before the play call can be signaled.

SUMMARY OF THE INVENTION

Accordingly, embodiments of the invention are directed to a system for displaying play calls to participants in an athletic competition that substantially obviates one or more of the problems due to limitations and disadvantages of the related art.

An object of embodiments of the invention is to provide a play calling system having a display that can be rapidly updated before the start of a play.

Another object of embodiments of the invention is to provide a play calling system that can be perceived by athletes at a great distance from the origin of the communication.

Another object of embodiments of the invention is to provide dynamic encoding of play calls which can be easily understood by athletes.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, the system for displaying play calls to participants in an athletic competition includes an input device for entering a play call to be represented by at least first and second characters, a selector for choosing third and fourth characters, a display device for displaying the characters, the display device including, a first block on the display device having at least three characters, a second block on the display device having at least three characters, a division separating the first block from the second block, the first character positioned in the first block, the first character being entered by the play caller, the second character positioned in the first block, the second character being selected by the selector, the third character positioned in the second block, the third character being selected by the play caller, and the fourth character positioned in the second block, the fourth character being selected by the selector.

In another aspect, the system for displaying play calls to participants in an athletic competition includes an input device for entering a play call to be represented by at least first and second characters, a selector for choosing third and fourth characters, a display device for displaying the characters, the display device including, a first block on the display device having at least three characters, a second block on the display device having at least three characters, a third block on the display device having at least three characters, a fourth block on the display device having at least three characters, a plurality of divisions separating the first, second, third, and fourth blocks, the first character positioned in the first block, the first character being entered by the play caller, the second character positioned in the first block, the second character being entered by the play caller, a third character positioned in the first block, the third character being selected by the selector, and a fourth character positioned in the second block, the fourth character being entered by the play caller.

In yet another aspect, a method for displaying play calls to participants in an athletic competition includes entering a play data into an input device, generating a dummy data, creating a first block of at least three characters having a first portion of the play data and a first portion of the dummy data, creating a second block of at least three characters having a second portion of the play data and a second portion of the dummy data, and displaying both the first block and the second block on a display device such that the first block and the second block are separated by a division.

In another aspect, the system for displaying play calls to participants in an athletic competition includes an input device for entering a play call to be represented as a block of at least three characters, a selector for choosing a second, third, and fourth blocks of at least three characters, a display device for displaying the characters, the display device including the first block on the display device having at least three characters selected by the play caller, the second block on the display device having at least three characters selected by the selector, the third block on the display device having at least three characters selected by the selector, the fourth block on the display device having at least three characters selected by the selector, and a plurality of divisions separating the first, second, third, and fourth blocks.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

Figure 2:
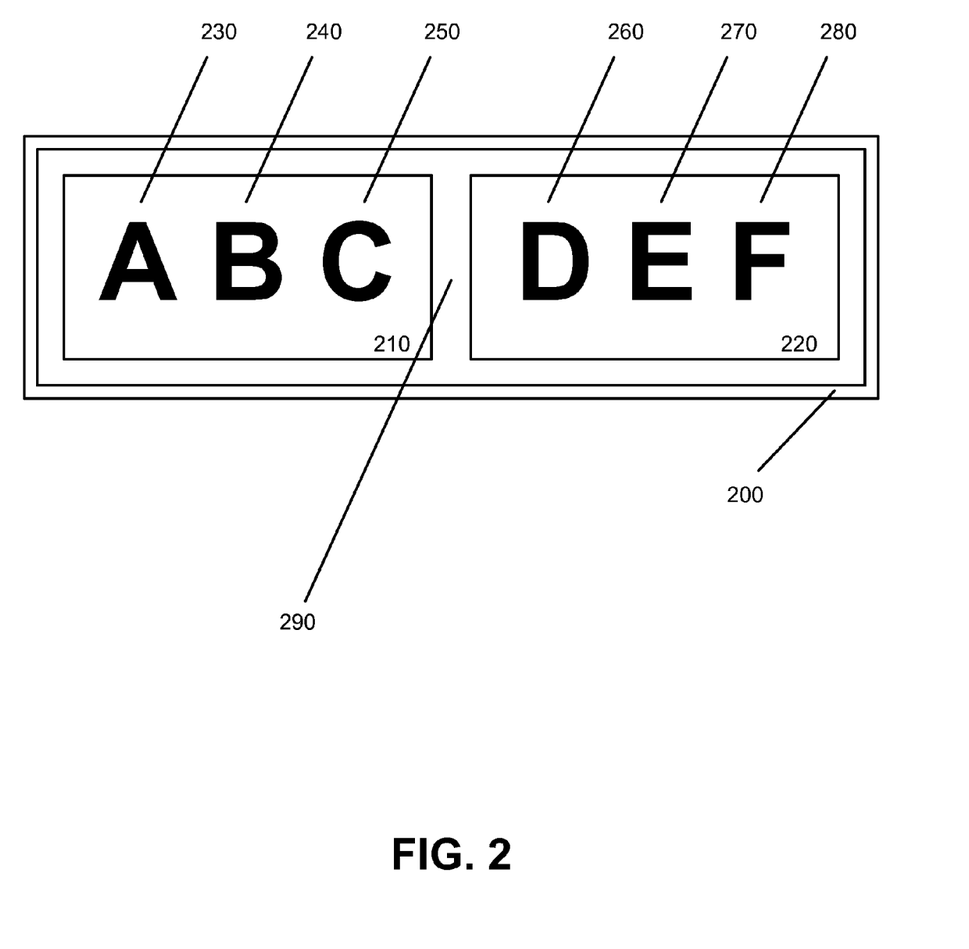
FIG. 2 is a diagram of a display device for a play calling system according to an exemplary embodiment of the invention.

FIG. 2 is a diagram of a display device for a play calling system according to an exemplary embodiment of the invention. As shown in FIG. 2, the display device for a play calling system includes an electronic display board 200, a first block 210 of characters, a second block 220 of characters, and a separator 290. The first block 210 contains three characters 230, 240, and 250. The second block 220 contains thee characters 260, 270, and 280.

In an exemplary embodiment, the characters in positions 230 and 260 can represent play call data. The play call data can represent attributes of the play to be executed. For example, an "A" for character 230 can represent a passing play in football. A "D" for character 260 can represent that a particular receiver is the target for the pass.

The characters in positions 240, 250, 270, and 280 can represent dummy data. The dummy data is provided to obfuscate the play call data. Athletes on the team making the play calls know both the encoding scheme and the position of the valid data. For example, prior to a game, the athletes may be instructed that the character in position 230 is the play, and the character in position 260 is the intended receiver. The athletes are also instructed which plays are represented by which characters, and which receivers are represented by which characters. In a game situation, the athletes will know to look to the first character of each block to know which play is being called.

The relative positions of the play call data and the dummy data can change between games or even within periods of the game. In the example above, the first character in each block was described to represent the play call data. However, it is possible to switch this data to other positions and substitute dummy data in its place. For example, during the first half of a competition, the athletes can be informed that play call data is in positions 230 and 260. During the second half of a competition, the athletes can be informed that play call data is in positions 240 and 270. In this way, the obfuscation of play call data can be dynamic without requiring the athletes to learn a completely new encoding algorithm.

The play call data can represent numerous aspects of the play call. For example, in football the play call data can represent the type of play such as a running play or a passing play. The play call data can also represent the type of running play such as "sweep right" or the type of passing play such as "15-yard slant". The play call data can represent other aspects of a football play such as motion, snap count, play action, secondary targets, and formation.

While the example described above in conjunction with FIG. 1 supports two attributes of play data to be displayed on the display device 200, additional play attributes of play data can be added by substituting play data attributes for dummy data. In such a scenario a block can contain two characters of play data and one character of dummy data.

The display device 200 can be controlled by an external input device such as an Apple iPad (not shown) or smart phone (not shown). The input device can have custom software which enables a play caller to input attributes of the play and have the play sent to the display device 200. The input device can also add in dummy data to fill the unused characters on the display device 200.

In an embodiment, a processor can randomly select dummy data from the set of possible characters. The processor can also select dummy data sudo-randomly by excluding certain characters which may cause confusion with the athletes or violate a constraint implemented by the play caller. Take for example an exemplary encoding of four receivers: [Jim, Jack, Johnny, José] to numbers [1, 3, 5, 9]. In this example a receiver will know he is the primary target if his number appears anywhere in the second block 220 of characters. Only one receiver can be the primary target so the second block 220 can only list the number of one receiver. In this case the dummy data must be selected from the set of characters that is not a receiver number to avoid the possibility of inadvertently calling multiple receivers. Here, a second block 220 having the numbers [234] would be valid because it refers to only receiver 3 (Jack) as the primary target. Alternatively, a second block having the numbers [156] would be invalid because it references both receiver 1 (Jim) and receiver 5 (Johnny)

The separator 290 creates a clear demarcation between the first block 210 and the second block 220. It otherwise can be difficult for the athlete to quickly extract relevant data from a continuous stream of information. The separator 290 creates manageable divisions of the data into blocks so that the play data may be parsed more quickly by the athletes. The separator can be a physical separation of multiple LED panels. The separator can be a digitally character such as a dash or a hyphen. The separator can be a nonprintable digital character, such as space character or a tab character.

The display device 200 can be and LED or LCD or other similar display device. An LED display device is advantageous because of their low-cost, durability, and availability in a variety of sizes. Off-the-shelf LCD, OLED, or Plasma flat-panel televisions are also contemplated and may become more advantageous as the cost point of these types of devices decreases over time.

Figure 3:
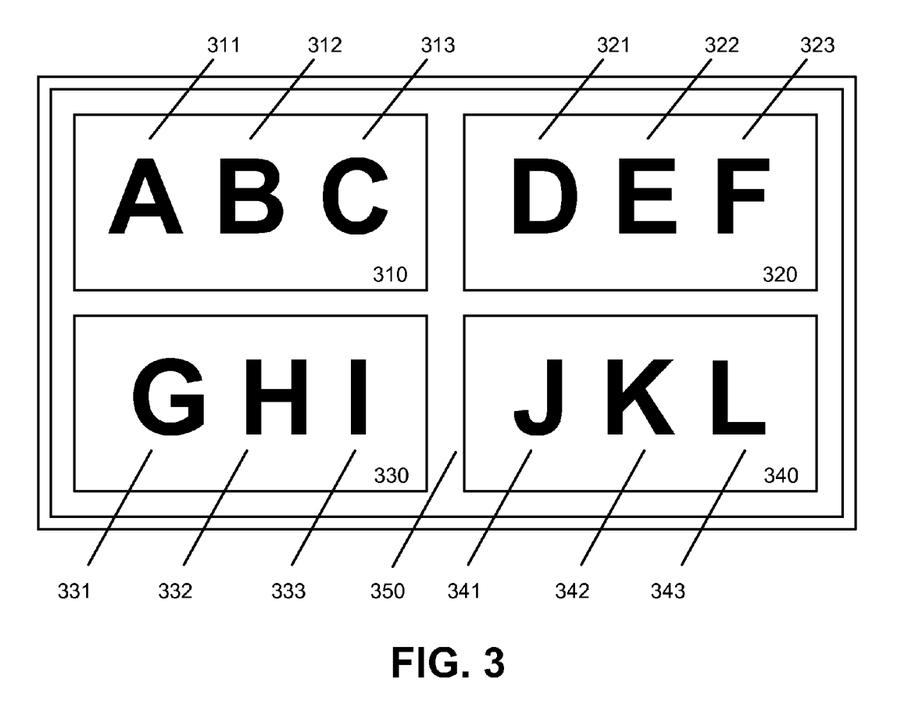
FIG. 3 is a diagram of a display device for a play calling system according to an exemplary embodiment of the invention.

FIG. 3 is a diagram of a display device for a play calling system according to an exemplary embodiment of the invention. As shown in FIG. 3, the display device for a play calling system includes an electronic display board 300 and a first, second, third, and fourth blocks 310-340 of characters, respectively. The blocks 310-340 are separated by a divider 350. The first block 310 characters 311-313. The second block 320 contains characters 321-323. The third block 330 contains characters 331-333. The fourth block 340 contains characters 341-343.

In an exemplary embodiment, one of the characters from each block can represent play call data and the remaining characters can represent dummy data. The dummy data serves to obfuscate the play call date and prevent an opposing team from deciphering the play before it is executed. Each character of the play call data can represent an attribute of the play to be executed. For example, an "A" for character 311 can represent a passing play in football. A "D" for character 321 can represent that a particular receiver is the target for the pass. A "G" for character 331 can represent the type of pass play. A "J" for character 341 can represent the snap count.

A divider 350 is provided to clearly demarcate the four blocks of characters 310-340. The divider 350 can be a physical divider such as a piece of plastic or tape. The divider 350 can also be a digital or electronic divider such as a printable or nonprintable character.

The characters 311-313, 321-323, 331-333, and 341-343 can be characters be any character, symbol, graphic, vector image, bitmap, or picture and are not limited to the set of letters, numbers, and symbols which are typeable on a computer keyboard. The characters can include both upper case and lower case letters in any language that is capable of being displayed on the display device 300.

Figure 4:
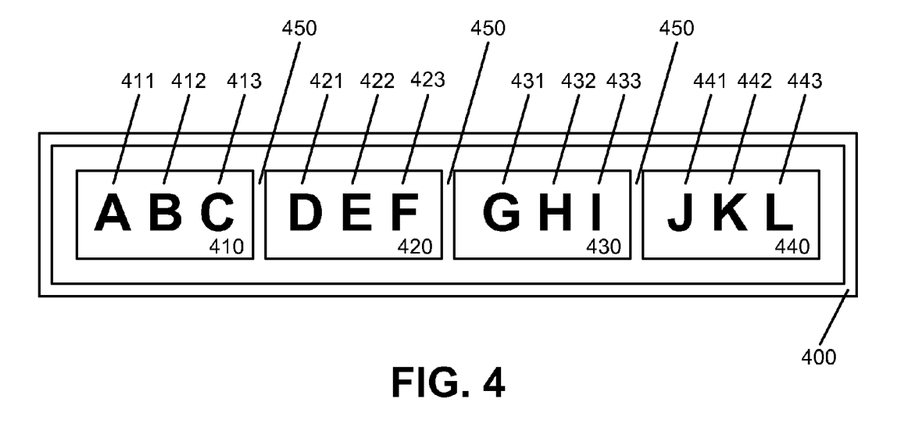
FIG. 4 is a diagram of a display device for a play calling system according to an exemplary embodiment of the invention.

FIG. 4 is a diagram of a display device for a play calling system according to an exemplary embodiment of the invention. As shown in FIG. 4, the display device for a play calling system includes an electronic display board 400 and a first, second, third, and fourth blocks 410-440 of characters, respectively. The blocks 410-440 are separated by a divider 450. The first block 410 characters 411-413. The second block 420 contains characters 421-423. The third block 430 contains characters 431-433. The fourth block 440 contains characters 441-443.

In an exemplary embodiment, two characters from block 410 and an unspecified character from block 440 can represent play call data and the remaining characters can represent dummy data. The dummy data serves to obfuscate the play call date and prevent an opposing team from deciphering the play before it is executed. Each character of the play call data can represent an attribute of the play to be executed. For example, an "A" for character 411 can represent a passing play in football. A "B" for character 412 can represent the type of pass play. An unspecified character from block 440 can represent that a particular receiver is the target for the pass. If each receiver is given a number, and that receiver's number appears anywhere in block 440, both the passer and the receiver will know the intended target.

For example, if there are three receivers on a team and each receiver is given a letter such as [L, R, Q], both the receiver and the passer will know that "L" is the intended target because his letter appears as character 443 in block 440 as shown in FIG. 4. The remaining characters in block 440 can be filled with dummy data. Blocks 420 and 430 can be filled with dummy data. Character 413 of block 410 can be filled with dummy data.

A divider 450 is provided to clearly demarcate the four blocks of characters 410-440. The divider 450 can be a physical divider such as a piece of plastic or tape. The divider 450 can also be a digital or electronic divider such as a printable or nonprintable character, line, or graphical element.

Figure 5A:
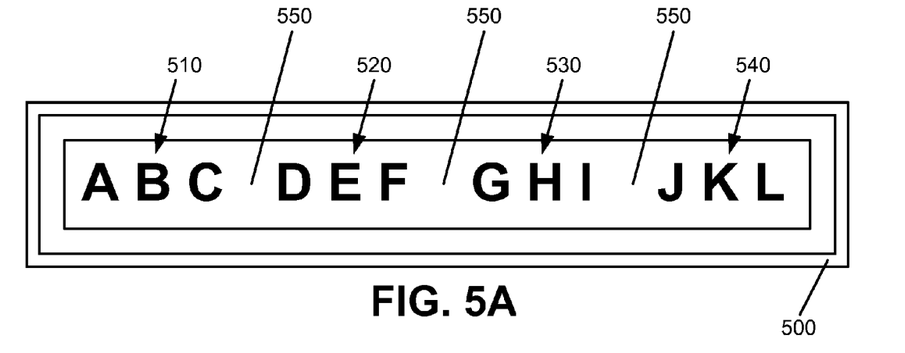
FIG. 5A is an alternative embodiment of the display device for the play calling system of FIG. 4.

FIG. 5A is an alternative embodiment of the display device for the play calling system of FIG. 4. As shown in FIG. 5A, the display device for a system for displaying play call data includes a display device 500, four blocks 510-540 of characters and dividers 550 between the blocks 510-540. In this alternative embodiment the display device is an LED display board having an array of LEDs which can used to display characters in accordance with embodiments of the invention. The LED display board is continuous in that the LED array is not interrupted within the bounds of the LED display device. Accordingly, the dividers 550 are formed by using spaces characters to generate logical blocks of characters 410-440. Although spaces are shown, other digital dividers would also serve the same purpose such as dashes, hyphens, tabs, commas, semicolons, or other delimiting symbols.

Figure 5B:
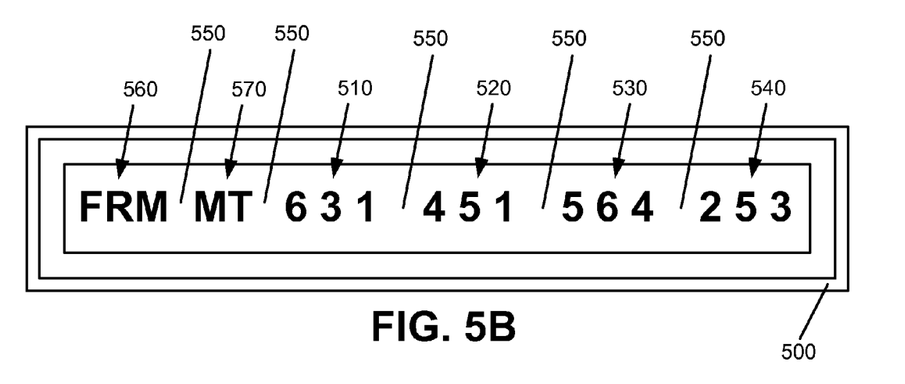
FIG. 5B is a diagram of a display device for a play calling system according to an exemplary embodiment of the invention.

FIG. 5B is a diagram of a display device for a play calling system according to an exemplary embodiment of the invention. As shown in FIG. 5B, a display device for a system for displaying play call data can also include additional blocks 560 and 570 to communicate formation and motion information. This information can be transmitted or displayed in plain text as any secrecy or surprise is immediately revealed when the athletes line up.

Figure 5C:
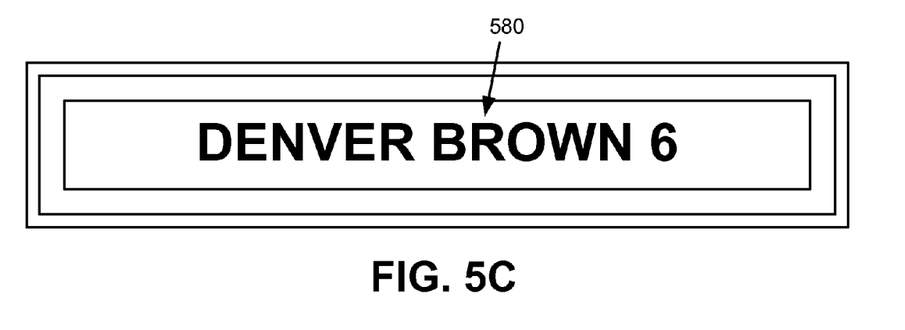
FIG. 5C is a diagram of a play calling system according to an exemplary embodiment of the invention.

FIG. 5C is a diagram of a play calling system according to an exemplary embodiment of the invention. As shown in FIG. 5C, a system for displaying play call data can include a single word or phrase 580. This phrase can indicate a single play or sequence of plays to the athletes. For example, the phrase "DENVER BROWN 6" may indicate "counter run play" for "DENVER" and "right-side 6-hole" for "BROWN 6". In an alternative embodiment the phrase can be a single word. For example, the word "NASCAR" may indicate a 5-play sequence to be executed when less than two minutes remain.

Figure 6:
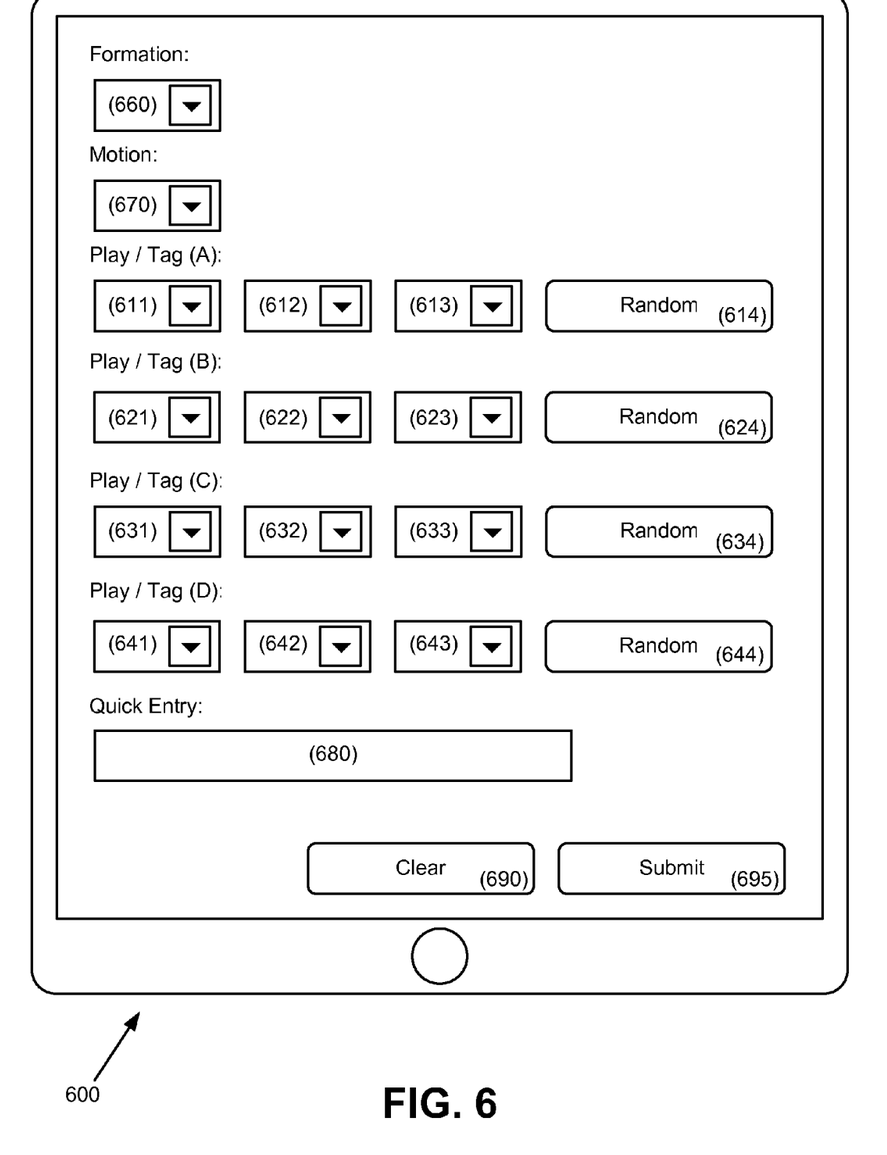
FIG. 6 is a diagram of an input device for a play calling system according to an exemplary embodiment of the invention.

FIG. 6 is a diagram of an input device for a play calling system according to an exemplary embodiment of the invention. As shown in FIG. 6, an input device 600 runs custom software which can accept input from the user. The input device has drop-boxes and edit boxes where the user can specify attributes of the play to be called.

Referring to FIG. 6 and FIG. 5B, the user can select a formation 660 and a motion 670 to appear on the display device at 560 and 570, respectively. The user can select each character 611-613 to be displayed on the display device in a first block 510. The user can select each character 621-623 to be displayed on the display device in a second block 520. The user can select each character 631-633 to be displayed on the display device in a third block at 530. The user can select each character 641-643 to be displayed on the display device in a fourth block 540. The user may also provide a "quick entry" 680 which displays the entered text directly on the display device as in FIG. 5C element 580.

The input device also provides "random" buttons 614, 624, 634, and 644. The random buttons serve to fill the fields which were unspecified by the user with dummy data. The random buttons 614, 624, 634, and 644 can correspond to the drop-boxes 611-613, 621-623, 631-633, and 641-643 respectively. In other words, when a user clicks "random" button 614, only the drop-boxes 611-613 which are unspecified by the user are filled with dummy data. As discussed above, a processor can randomly select dummy data from the set of all characters. The processor can sudo-randomly select characters by limiting the set to those characters which do not violate a constraint of an encoding scheme implemented by the play caller.

When the play is fully specified and the dummy data is filled, the user can select "submit" 695 to have the play displayed on the display device. To prepare for a subsequent play, the user can select "clear" 690 to clear the data from the previous play. This system allows a play caller to quickly enter and display a play to the athletes. The play can be transmitted to the display device by connecting the input device to the display device by a wire. The play can also be transmitted from the input device to the display device wirelessly using wireless transmission technologies which are well known in the art.

The input device can be an off-the-shelf device which is commercially available such as an iPad, iPhone, Android device, windows mobile device, cellular telephone, smart phone, PDA, laptop computer, or other widely available electronic device. The off-the-shelf device can be augmented with custom software according to embodiments of the invention. Alternatively, the input device can be custom manufactured for compatibility with the inventive system. In preferred embodiments, the input device and the display device are ruggedized and weather proofed to withstand outdoor use in hostile environments such as rain, snow, and prolonged direct sunlight.

While the inventive system has been disclosed in embodiments related to the sport of American football, other events are contemplated including soccer, baseball, basketball, hockey, cricket, rugby, or any other sport where play call information must be communicated to athletes. This invention is equally applicable to events at all levels of competition from youth leagues to professional leagues.

It will be apparent to those skilled in the art that various modifications and variations can be made in the system for displaying play calls to participants in an athletic competition of embodiments of the invention without departing from the spirit or scope of the invention. Thus, it is intended that embodiments of the invention cover the modifications and variations of this invention provided they come within the scope of the appended claims and their equivalents.

What is claimed is:

1. A system for a play caller to display a play call to participants in an athletic competition, the system comprising:
    an input device for entering a play call to be represented by at least first and second characters;
    a selector configured to choose third and fourth characters;
    a display device for displaying the first, second, third and fourth characters, the display device including:
    a first block on the display device having at least three characters;
    a second block on the display device having at least three characters;
    a division separating the first block from the second block;
    the first character positioned in the first block, the first character being entered by the play caller;
    the third character positioned in the first block, the third character being selected by the selector;
    the second character positioned in the second block, the second character being entered by the play caller; and
    the fourth character positioned in the second block, the fourth character being selected by the selector;
    wherein the third and fourth characters are selected by the selector after the first and second characters are entered by the play caller.

2. The system of claim 1 further comprising:
    a fifth character positioned in the first block, the fifth character being selected by the selector; and
    a sixth character in the second block, the sixth character being selected by the selector.

3. The system of claim 1 further comprising:
    a third block on the display device having at least three characters.

4. The system of claim 1 wherein the selector randomly selects one of the third character and fourth character from a set of all characters.

5. The system of claim 1 wherein the selector randomly selects one of the third character and fourth character from a subset of all characters.

6. The system of claim 5 wherein the subset of all characters is the set of characters which do not violate a constraint of the play caller's encoding algorithm.

7. The system of claim 1, wherein the input is configured to receive any subset of characters from the play-caller and the selector is configured to choose the third and fourth characters from the received subset.

8. The system of claim 1, wherein at least one of the first, second, third and fourth characters comprises a character outside the set of letters, numbers, and symbols which are typeable on a computer keyboard.

9. The system of claim 1, further comprising a block on the display device comprising only characters chosen by the selector.

10. A system for a play caller to display a play call to participants in an athletic competition, the system comprising:
    an input device for entering a play call to be represented by at least first and second characters;
    a selector configured to choose a third character;

a display device for displaying the first, second and third characters, the display device including:
a first block on the display device having at least three characters;
a second block on the display device having at least three characters;
a third block on the display device having at least three characters;
a fourth block on the display device having at least three characters;
a plurality of divisions separating the first, second, third, and fourth blocks;
the first character positioned in the first block, the first character being entered by the play caller;
the second character positioned in the first block, the second character being entered by the play caller;
the third character positioned in the first block, the third character being selected by the selector; and
a fourth character positioned in the second block, the fourth character being entered by the play caller;
wherein the third character is selected by the selector after the first, second and fourth characters are entered by the play caller.

11. The system of claim 10 wherein the divisions comprise one or more characters.

12. The system of claim 11 wherein the one or more characters is a space character.

13. The system of claim 11 wherein the one or more characters is a dash character.

14. They system of claim 10 wherein the display device is an LCD.

15. The system of claim 10 wherein the display device is a light emitting diode panel.

16. The system of claim 10 further comprising:
a fifth block on the display device having at least 3 characters; and
a sixth block on the display device having at least 2 characters.

17. The system of claim 16 wherein the fifth block is a formation portion of a play call.

18. The system of claim 16 wherein the sixth block is a motion portion of a play call.

19. A method for displaying a play call to participants in an athletic competition, the method comprising:
entering a play data into an input device;
generating a dummy data;
creating a first block of at least three characters having a first portion of the play data and a first portion of the dummy data;
creating a second block of at least three characters having a second portion of the play data and a second portion of the dummy data; and
displaying both the first block and the second block on a display device such that the first block and the second block are separated by a division;
wherein the dummy data is generated after all clay data is entered into the input device.

20. The method of claim 19 further comprising:
creating a third block of at least three characters having a third portion of the dummy data; and
displaying the third block on the display device such that the first, second, and third blocks are separated by a division.

21. The method of claim 19 wherein the division is a character which creates visual separation between the first block and the second block.

22. The method of claim 21 wherein the division character is a space character.

23. The method of claim 19, wherein entering the play data in the input device comprises choosing one or more locations where the play data is displayed on the display device, wherein generating the dummy data comprises indicating in the input device that locations on the display device not chosen to display the play data are to be filled with randomly generated characters, and automatically generating random characters to be displayed in locations on the display device not chosen to display the play data.

24. The method of claim 23, wherein entering the play data in the input device comprises displaying fields associated with locations where the play data is displayed on the display device on an input device display, the fields including multiple fields associated with different characters of a single block on the display device, the multiple fields being configured such that the play caller may select a character for any of the multiple fields to be displayed in the associated location on the display device, further comprising displaying at least one dummy character generating input associated with at least one block on the display device on the input device display, wherein the dummy character generating input is configured to randomly generate dummy characters for all fields associated with the block the dummy character generating input is associated with, for which the play caller did not select a character.

25. A system for displaying a play call to participants in an athletic competition, the system comprising:
an input device for entering a play call to be represented as a block of at least three characters;
a selector configured to choose second, third, and fourth blocks of at least three characters;
a display device for displaying the first, second, third and fourth blocks, the display device including:
a first block on the display device having at least three characters selected by the play caller;
the second block on the display device having at least three characters selected by the selector;
the third block on the display device having at least three characters selected by the selector;
the fourth block on the display device having at least three characters selected by the selector; and
a plurality of divisions separating the first, second, third, and fourth blocks.

* * * * *